United States Patent [19]
Barksdale

[11] 4,191,388
[45] Mar. 4, 1980

[54] TAIL GATE STEP

[76] Inventor: Lester T. Barksdale, P.O. Box 729, Tavares, Fla. 32778

[21] Appl. No.: 911,336

[22] Filed: Jun. 1, 1978

[51] Int. Cl.² ............................................... B60R 3/02
[52] U.S. Cl. ..................................... 280/166; 182/91; 182/92; 296/62
[58] Field of Search ............... 280/166, 164, 163; 105/447; 296/62, 57 R; 182/91, 90, 92, 89

[56] References Cited

U.S. PATENT DOCUMENTS

| | | | |
|---|---|---|---|
| 338,048 | 3/1886 | Elliott | 105/447 |
| 474,353 | 5/1892 | Bailey | 296/57 R |
| 493,373 | 3/1893 | Alexander | 182/91 |
| 839,238 | 12/1906 | Wade | 105/447 |
| 1,181,367 | 5/1916 | Bourgon | 296/62 |
| 2,324,507 | 7/1943 | Johnson | 280/166 |
| 3,357,719 | 12/1967 | McCrea | 280/163 |
| 3,627,350 | 12/1971 | Cross | 280/166 |
| 3,799,288 | 3/1974 | Manuel | 182/91 |
| 3,826,337 | 7/1974 | Liptak et al. | 280/166 |
| 3,951,431 | 4/1976 | Hopkins | 182/89 X |
| 3,961,809 | 6/1976 | Clugston | 280/166 |
| 4,029,355 | 6/1977 | Wilhelmsen | 280/166 X |

*Primary Examiner*—Richard A. Bertsch
*Assistant Examiner*—Milton L. Smith
*Attorney, Agent, or Firm*—Duckworth, Hobby & Allen

[57] ABSTRACT

A step for coupling with a folding panel of a vehicle such as a tail gate of a truck or the like, includes a flat plate mounted against the inside surface of the folding panel, and a pair of support rods extending from the plate and through the panel to facilitate rapid removal of the plate from the panel. A pair of step supports are pivoted at opposing flanges to the plate, and support a step at the extremity thereof. The apparatus is dimensioned such that the step supports and the step may be rotated to a storage position across the plate and the panel when not in use.

10 Claims, 4 Drawing Figures

U.S. Patent    Mar. 4, 1980    4,191,388
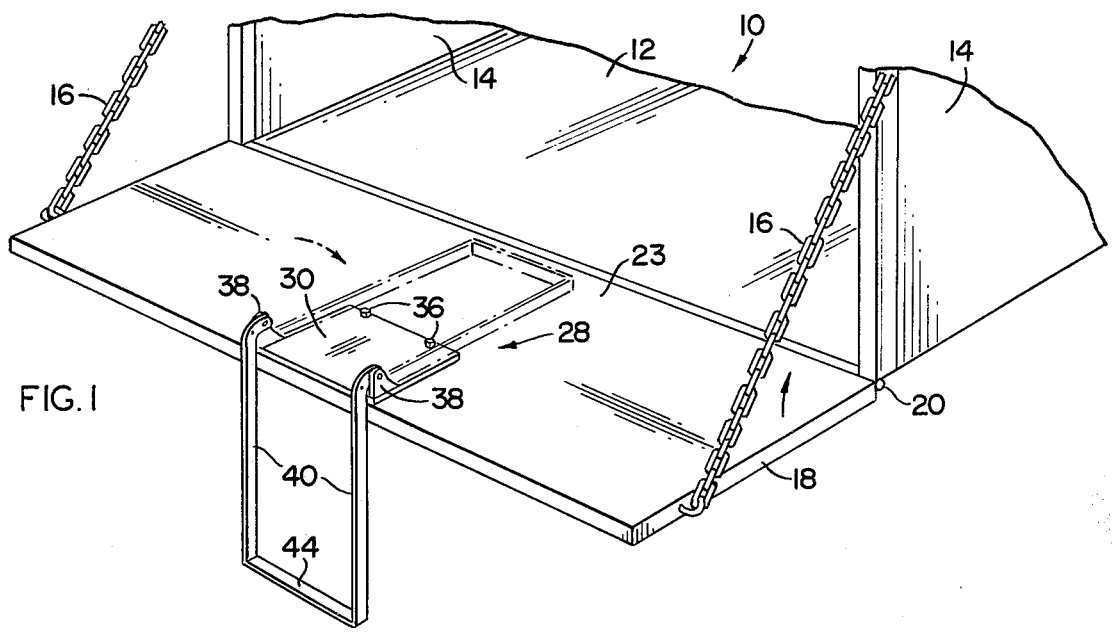
FIG. 1
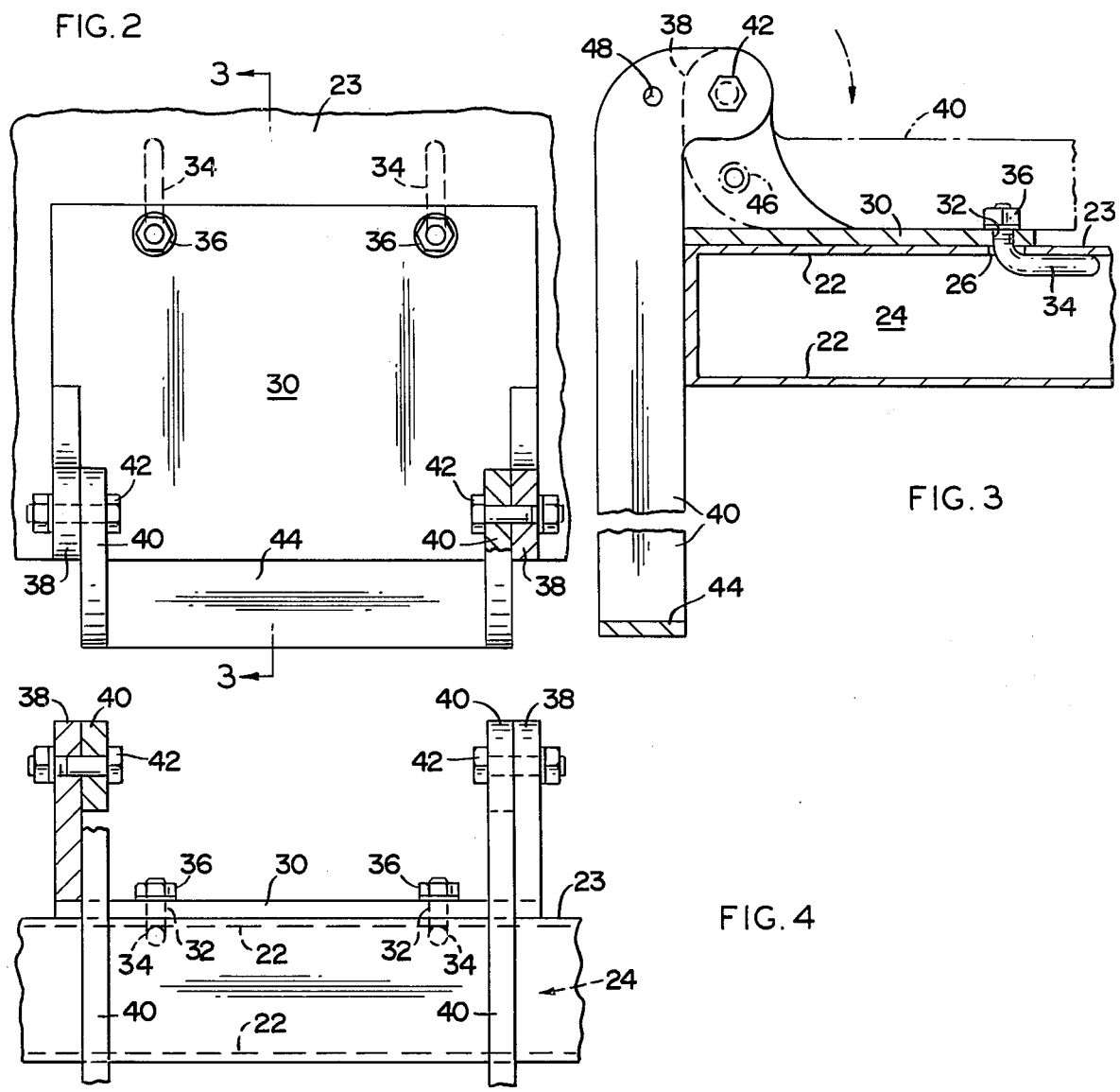
FIG. 2
FIG. 3
FIG. 4

TAIL GATE STEP

BACKGROUND OF THE INVENTION

1. Field of the Invention

The present invention relates to improvements in road vehicles, and in particular, relates to steps adapted for specific use with the tail gates of trucks and the like.

2. Description of the Prior Art

Pickup trucks were originally designed for use as utility vehicles, in which workmen used the open bed of the vehicle for various industrial and agricultural functions. Customarily, the workmen did not require an intermediate step from the tail gate of the truck to permit access into the bed of the truck, since the truck bed was not of sufficient height to justify that additional apparatus.

However, with the advent of the use of camper bodies and similar arrangements adapted specifically for use with pickup trucks, persons of smaller stature, i.e., women and children frequently require access to the bed of the pickup truck; therefore, it has become desirable to provide an intermediate step to permit easy access into the truck body.

A number of intermediate step arrangements have been designed in the prior art.

Early examples of such arrangements are disclosed in U.S. Pat. No. 493,373 to Alexander, and No. 1,181,367 to Bourgon. In particular, the Bourgon arrangement employs a plate which is mounted against the inside of the tail gate of the truck, and has a hinged plate which may be rotated to the horizontal position when the truck tail gate is dropped to a complete vertical position below the truck bed.

Another arrangement is disclosed in U.S. Pat. No. 3,799,288 to Manuel. This arrangement is adapted to fold down to a useful position, and thereafter to be folded across the top of a truck bumper when not in use. The arrangement disclosed by Manuel includes brackets which extend rearwardly from the truck away from the back surface of the bumper, thus creating a substantial risk of damage if the brackets are struck by another vehicle from the rear, or are damaged in the process of backing the vehicle to which the step is attached.

Liptak, et al., discloses in U.S. Pat. No. 3,826,337, a retractable ladder for use on the side of a truck. The arrangement so disclosed incorporates a U-shaped bracket having curved, L-shaped extensions on the extremities thereof, permitting the sides of the step to be locked against the inside of the metal panel to which the step is attached.

Another arrangement is taught by Clugston in U.S. Pat. No. 3,961,809. This arrangement is likewise foldable into a storage position, when not in use. A "bumper flip step" is disclosed by Cross in U.S. Pat. No. 3,627,350. The arrangement taught by Cross likewise permits folding into a storage position when not in use; however, as with the arrangement disclosed by Manuel, the Cross arrangement employs brackets which extend away from the bumper of vehicle, and thus create a potential risk of damage as described above.

Other prior art of interest is disclosed by Johnson, in U.S. Pat. No. 2,324,507; Wilhelmsen, in U.S. Pat. No. 4,029,355; and Hopkins, in U.S. Pat. No. 3,951,431.

SUMMARY OF THE INVENTION

The present invention contemplates a step for coupling with a folding panel of a vehicle, such as the tail gate of a truck or the like, and comprises a support member for mounting against the inside surface of the folding panel. The step arrangement further includes means coupling the support member with the panel for facilitating rapid removal of the support member from the panel, a step, and and means for pivotably coupling the step with the support member such that the step may be pivoted to a stepping position below the panel when the panel is in the horizontal position.

An important aspect to the present invention is the utilization of an arrangement which permits the rapid removal of the step structure, or for permitting the step to remain with the vehicle, but to be maintained in a stored position which does not create a potential damage problem. To this end, the step arrangement employs means which permit the entire step assembly to be mounted along the inside surface of the foldable panel used with the vehicle such as the tail gate of the truck. This avoids the risk of damage problem discussed above with respect to certain prior art arrangements.

As was noted above with respect to the Liptak, et al, patent, this arrangement permits the step to be stored when not in use within the vehicle; however, while in the stored position, a portion of the step remains outside of the vehicle, and thus creates a likelihood that the step may be improperly used by vandals or the like. The step arrangement of the present invention is particuarly adapted to avoid the shortcomings of the prior art in this regard as well.

In a specific arrangement in accordance with the present invention, the step structure employs a flat plate abutting a first surface of the truck tailgate, which first surface faces the space defined by the sides of the truck when the panel is in the vertical position. Customarily, the truck is formed of a pair of parallel metal sheets defining a void therebetween. The arrangement of the present invention includes a pair of spaced holes extending through the metal sheet defining the inside surface of the tailgate. A pair of L-shaped rods are fixed to the plate and extend through the holes in the sheet to hold the plate in abutment with that surface. A pair of spaced flanges are joined to the plate in a manner such that an imaginary line between the flanges is substantially parallel with the hinge line between the tail gate and the truck. A pair of oblong step supports are provided, each support pivoted at one end to one of the flanges. A flat step is fixed between the extremities of the two supports opposite the one end of each support, and the length of the step supports and the distance between the flanges and the hinge line is adjusted such that the step supports may be rotated to a storage position across the plate and between the flanges and the hinge line, when the step is not in use.

DESCRIPTION OF THE DRAWINGS

FIG. 1 is a perspective view of a portion of a vehicle adapted to employ the step arrangement in accordance with the present invention.

FIG. 2 is a top plan view of a portion of the structure shown in FIG. 1.

FIG. 3 is a cross-sectional side view of a portion of the apparatus as shown in FIG. 2, taken along the line 3—3.

FIG. 4 is a front elevation of a portion of the apparatus shown in FIGS. 1, 2, and 3.

DETAILED DESCRIPTION

A preferred embodiment of the present invention will now be described with reference to the drawings.

First noting FIG. 1, the present invention is adapted for use with a truck 10, such as a pickup truck having a bed 12 and a pair of opposing sides 14 defining a storage space therein. The truck 10 includes a tail gate 18 joined to the truck by a hinge 20 which defines a hinge line parallel therewith. Typically, the truck 10 is provided with a chain 16 or other means to restrict the rotation of the tail gate 18 to a horizontal position.

Other conventional features of the truck will be understood with reference to FIG. 3. The tail gate 18 is formed of a pair of parallel metal sheets 22, defining a void 24 therebetween. In accordance with the present invention, the inside metal sheet which defines a first outside surface 23 is provided with a pair of spaced holes 26, the holes being dimensioned such that an imaginary line between the holes is parallel with the hinge line defined by the hinge 20.

The structure of the step arrangement in accordance with the present invention will now be described with reference to FIGS. 1 and 4.

The structure of the step is referred to generally as 28 in FIG. 1. The step structure 28 includes a flat plate 30 which is mounted flush with the first outside surface 23 of the tail gate 18. The flat plate 30 is provided with a pair of spaced holes 32, corresponding to the holes 26 in the first surface 23 of the metal sheet 22. As shown in FIG. 3, the holes 32 are spaced from one edge of the plate 30 a slight distance, and the plate is dimensioned such that the other edge does not extend beyond the end of the tail gate 18.

The step arrangement 28 is provided with a pair of L-shaped rods 34, each rod 34 extending through one of the holes 32 in the plate 30 and through the holes 26 in the sheet 22 of the tail gate 18. The bend in each rod 34 is adapted to permit only a slight amount of play between the rod and the inside surface of the sheet 22 within the void 24, in order to hold the plate 30 in abutment with the outside surface 23. Each rod 34 is secured on one end by a nut 36 on the outside of the plate 30.

The step arrangement 28 is further provided with a pair of flanges 38 extending upward from the plate 30 at the edge of the plate adjacent the end of the tail gate 18. A pair of parallel step supports 40 are provided, each preferably having a curved first end extending from one of the flanges 38, and being pivotable at the flange by virtue of a bolt 42 extending through the curved extremity of the corresponding step support 40 and the flange 38. A step 44 is fixed between the other extremity of each step support 40.

Referring now to FIG. 1, the length of the step supports 40 is specifically designed to permit the step supports to be rotated to a storage position across the plate and against the outside surface 23, but short of the hinge line defined by the hinge 20. In this way, the entire step structure 28 may be stored against the tail gate, and be protected from risk of damage when the tail gate is up in the vertical position and in normal use.

A particularly important aspect of the present invention is the manner in which rapid removal of the entire step structure 28 may be facilitated. With reference to FIG. 3, it will be seen that the structure may be removed by simply rotating the plate 30 at the end adjacent the flanges 38 slightly away from the outside surface 23, permitting the L-shaped rods 34 to be rotated out of the corresponding hole 26 in the metal sheet 22 defining the tail gate 18. In this manner, the tail gate step may be easily removed without unnecessary use of tools to remove fasteners such as bolts, sheet metal screws, and the like.

With reference to FIG. 1, it will also be understood by those skilled in the art that the step structure 28 permits the step 44 to be rotated to a substantially low position with respect to the tail gate 18, thus permitting persons of smaller stature to gain entry into the truck bed 12 without crawling up onto the tail gate 18.

I claim:

1. In combination:

a vehicle having a foldable panel pivoted by a hinge to a portion of the vehicle, said panel having holes therein;

a plate mounted against said panel, said panel including a pair of sheets with a void therebetween, said holes extending through one of said sheets;

means extending through said holes for removably coupling said plate with said panel;

a step; and means for pivotably coupling said step with said support member such that said step may be pivoted to a stepping position below said panel when said panel is in the horizontal position, said coupling means including a pair of rods, each rod having a first leg and a second leg substantially normal to said first leg, said first leg coupled substantially normal to said plate and extending through one of said holes, and wherein said second leg extends substantially parallel with said sheet and through said void.

2. The combination recited in claim 1 wherein said second legs of both said rods are substantially parallel.

3. The combination recited in claim 2 wherein each said first leg is joined to said plate at a point spaced from an edge thereof, and wherein said second leg of each said rod extends toward said hinge.

4. The combination recited in claim 3, wherein said pivotably coupling means comprises:

a pair of spaced flanges carried by said plate; and a pair of extension members, each extension member pivoted at one end to one of said flanges and fixed at the other end to one side of said step.

5. The combination recited in claim 4 wherein said extension members are shorter than the dimension between said flanges and said hinge, so as to permit said extension members to be rotated to a storage position across said plate and between said flanges and said hinge, when said step is not in use.

6. A vehicle of the type having a space defined by vertically disposed side panels, wherein one of said panels is joined to said vehicle by a hinge to permit said hinged panel to be rotated about a hingeline to the horizontal position, and wherein said panel includes a pair of parallel metal sheets defining a void therebetween, said vehicle further comprising:

a flat plate abutting a first outside surface of said panel which faces said space when said panel is in the vertical position;

said panel including a pair of spaced holes extending through that one of said metal sheets which includes said first outside surface;

a pair of L-shaped rods fixed to said plate and extending through said holes in said panel to hold said plate in abutment with said first outside surface;

a pair of spaced flanges joined to said plate in a manner such that an imaginary line between said flanges is substantially parallel with said hingeline;

a pair of oblong step supports, each support pivoted at one end to one of said flanges;

a flat step fixed between the extremities of said two supports opposite said one end of each support; and wherein the length of said step supports and the distance between said flanges and said hingeline is adjusted such that said step supports may be rotated to a storage position across said plate and between said flanges and said hingeline, when said step is not in use.

7. The combination recited in claim 6 wherein said vehicle comprises a truck and said panel comprises the tail-gate of said truck.

8. The combination recited in claim 7 wherein said L-shaped rods include a first leg and a second leg substantially normal to the first leg, the first leg coupled substantially normal to the plate and extending through a corresponding hole in the panel, and wherein said second leg extends substantially parallel with the sheets and through the void.

9. The combination recited in claim 8 wherein said flanges extend normal to said first outside surface.

10. The combination recited in claim 7 wherein said step supports abut the extremity of said tail-gate.

* * * * *